United States Patent
Xia et al.

(10) Patent No.: US 9,429,986 B2
(45) Date of Patent: Aug. 30, 2016

(54) ELECTRONIC DEVICE

(71) Applicants: Beijing Lenovo Software Ltd., Beijing (CN); Lenovo (Beijing) Co., Ltd., Beijing (CN)

(72) Inventors: Xiaosong Xia, Beijing (CN); Chunfeng Yuan, Beijing (CN); Zhifeng Xin, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 283 days.

(21) Appl. No.: 14/035,503

(22) Filed: Sep. 24, 2013

(65) Prior Publication Data

US 2014/0085795 A1     Mar. 27, 2014

(30) Foreign Application Priority Data

Sep. 26, 2012    (CN) .......................... 2012 1 0363870

(51) Int. Cl.
G06F 1/16    (2006.01)
(52) U.S. Cl.
CPC ............. *G06F 1/1618* (2013.01); *G06F 1/162* (2013.01)
(58) Field of Classification Search
CPC ........................................ G06F 1/1615–1/162
USPC .................................................... 361/679.27
See application file for complete search history.

(56) References Cited

U.S. PATENT DOCUMENTS

| | | | | |
|---|---|---|---|---|
| 5,267,123 A * | 11/1993 | Boothroyd | ............ | G06F 1/1616 16/361 |
| 6,464,195 B1 * | 10/2002 | Hildebrandt | .......... | G06F 1/1616 248/460 |
| 6,636,419 B2 * | 10/2003 | Duarte | .................. | G06F 1/1616 312/223.2 |
| 6,826,043 B2 * | 11/2004 | Chang | ..................... | G06F 1/162 248/913 |
| 6,903,927 B2 * | 6/2005 | Anlauff | ................... | G06F 1/162 341/22 |
| 7,203,058 B2 * | 4/2007 | Hong | ...................... | G06F 1/162 248/917 |
| 7,239,505 B2 * | 7/2007 | Keely | .................. | G06F 1/1616 361/679.09 |

(Continued)

*Primary Examiner* — Anthony Q Edwards
(74) *Attorney, Agent, or Firm* — Harness, Dickey & Pierce, P.L.C.

(57) ABSTRACT

Disclosed is an electronic device including a first body, a second body connected with the first body, and a connecting member. The connecting member is hinged with the first body via a first hinge shaft and is hinged with the second body via a second hinge shaft, such as to enable the first body and the second body to be switched between an open state and a closed state. The electronic device is configured in such a manner that, in the closed state, a second housing of the first body snuggles against a first housing of the second body, and in the open state, a lower rim of the first body is located at a front portion of the second body; and the lower rim of the first body keeps abutting against the upper surface of the second body while the state of relative position is switched.

17 Claims, 9 Drawing Sheets

(56) References Cited

U.S. PATENT DOCUMENTS

| | | | | |
|---|---|---|---|---|
| 7,277,275 B2* | 10/2007 | Won | G06F 1/162 | |
| | | | | 249/918 |
| 7,551,426 B2* | 6/2009 | Huang | G06F 1/162 | |
| | | | | 361/679.02 |
| 7,652,873 B2* | 1/2010 | Lee | E05B 65/006 | |
| | | | | 248/917 |
| 7,813,125 B2* | 10/2010 | Huang | E05B 15/024 | |
| | | | | 361/679.55 |
| 8,336,168 B2* | 12/2012 | Huang | G06F 1/1681 | |
| | | | | 16/340 |
| 8,467,184 B2* | 6/2013 | Chen | G06F 1/162 | |
| | | | | 361/679.55 |
| 8,908,364 B2* | 12/2014 | Tseng | G06F 1/1616 | |
| | | | | 248/921 |
| 8,964,381 B2* | 2/2015 | Mai | G06F 1/1679 | |
| | | | | 361/679.06 |
| 8,988,863 B2* | 3/2015 | Hung | G06F 1/1601 | |
| | | | | 248/917 |
| 2004/0114315 A1* | 6/2004 | Anlauff | G06F 1/162 | |
| | | | | 361/679.28 |
| 2007/0030634 A1* | 2/2007 | Maskatia | G06F 1/1616 | |
| | | | | 361/679.27 |
| 2008/0024975 A1* | 1/2008 | Huang | G06F 1/162 | |
| | | | | 361/679.44 |
| 2012/0229962 A1* | 9/2012 | Chen | G06F 1/162 | |
| | | | | 361/679.01 |
| 2014/0043737 A1* | 2/2014 | Chen | H05K 5/0226 | |
| | | | | 361/679.01 |
| 2014/0043749 A1* | 2/2014 | Lai | G06F 1/162 | |
| | | | | 361/679.27 |
| 2014/0049891 A1* | 2/2014 | Lee | G06F 1/1637 | |
| | | | | 361/679.15 |

* cited by examiner

ELECTRONIC DEVICE

The present application claims the priority of Chinese Patent Application No. 201210363870.6 titled "ELECTRONIC DEVICE" and filed with the State Intellectual Property Office on Sep. 26, 2012, the entire disclosure of which is incorporated herein by reference.

FIELD OF THE INVENTION

The present application relates to the technical field of electronic products, and in particular to an electronic device.

BACKGROUND OF THE INVENTION

With the development of new technologies and user's various demands, there is a trend of developing electronic products in new forms through the old. Taking a personal computer (PC) product as an example, it has been developed in sequence from a desktop, a notebook, a netbook to a tablet computer PAD as a new member of the PC family.

In the prior art, a PAD has a small volume and weight, and the place where the PAD is in use can be transferred at any time. As a mature product, the PAD has been used by more and more users. A conventional PAD is a PC which has neither flip-open cover nor keyboard and is so small to be carried in a woman's handbag but has a full function, and has a touch screen as a basic input means, so that a user may input something through an in-built handwriting recognition, a virtual keyboard on the screen or a speech recognition. Apparently, compared with the conventional keyboard input at a typing speed up to 30 to 60 words per minute, the handwriting input of the PAD or the keyboard input of the virtue keyboard of the PAD is obviously too slow, which fails to meet the special application requirement of a fast input.

Since the conventional PAD has no keyboard and thus is inconvenient to input lots of words, there have been developed lots of products in which a base with a keyboard is incorporated into the PAD in order to solve the problem of inputting words very slowly. Specifically, by inserting and mounting the PAD onto the keyboard base, the input operation may be performed via the keyboard. However, it is rather inconvenient to carry, since in addition to the PAD, the user has to carry the base having the keyboard when going out each time, In view of the fact, it is desirable to optimize the prior art, specifically to provide an electronic device which can be switched between a closed state and an open state with ease and improve the user's experience.

SUMMARY OF THE INVENTION

In view of the above deficiencies, an object of the present application is to provide an electronic device with an improved structure, which is capable of switching the application modes conveniently based on a series of optimized mechanisms.

An electronic device according to the present application includes a first body, a second boy connected with the first body, and a connecting member. The connecting member is hinged with the first body via a first hinge shaft and is hinged with the second body via a second hinge shaft, such as to have a state of relative position between the first body and the second body switched between an open state and a closed state. The electronic device is configured in such a manner that, in the closed state, a second housing of the first body snuggles against a first housing of the second body, and in the open state, a lower rim of the first body is located at a front portion of the second body; and the lower rim of the first body keeps abutting against the upper surface of the second body while the state of relative position is switched.

Preferably, the electronic device further includes a first elastic component. The first elastic component is arranged between a first hinge end of the connecting member hinged with the first body and the first body, and is configured in such a manner that the first elastic component in the closed state has an elastic deformation generating a force for switching the first body into the open state, such that the lower rim of the first body keeps abutting against the upper surface of the second body while the state of relative position is switched.

Preferably, the first elastic component is a first torsion spring arranged to be coaxial with the first hinge shaft.

Preferably, the center of gravity of the first body is located between the lower rim of the first body and a hinge portion of the first body hinged with the connecting member, such that the lower rim of the first body keeps abutting against the upper surface of the second body while the state of relative position is switched.

Preferably, matched magnetic components are provided on the upper surface of the second body and the lower rim of the first body, respectively, so that the lower rim of the first body keeps abutting against the upper surface of the second body while the state of relative position is switched.

Preferably, the electronic device further includes a second elastic component and a lock-release mechanism. The second elastic component is arranged between a second hinge end of the connecting member hinged with the second body and the second body, and is configured in such a manner that the second elastic component in the closed state has an elastic deformation generating a force for driving the connecting member to be switched into the open state. The lock-release mechanism is arranged on the second body and configured to lock or release the connecting member in the closed state.

Preferably, the lock-release mechanism includes a force applying rod and a lock-release connecting rod. A force applying end of the force applying rod is located outside a housing of the second body. A middle portion of the lock-release connecting rod is hinged to the second body; one end of the lock-release connecting rod is hinged with the force applying rod, and the other end of the lock-release connecting rod is provided with a position-limiting portion. The lock-release connecting rod is configured in such a manner that, the position-limiting portion in the closed state is located above the connecting member so as to lock the connecting member; a force applied from the force applying end can drive the lock-release connecting rod to rotate till the position-limiting portion is located beside the connecting member so as to release the connecting member.

Preferably, the lock-release mechanism further includes a third elastic component arranged between the lock-release connecting rod and the second body so as to facilitate returning the lock-release connecting rod.

Preferably, two lock-release connecting rods and two third elastic components are provided and arranged symmetrically with respect to the force applying rod.

Preferably, a first shaft segment at one end of the second hinge shaft is pivotally connected with and in a clearance fit with the connecting member; and a second shaft segment at the other end of the second hinge shaft is pivotally connected with the second body, having a rotating friction therebetween. The electronic device is configured in such a manner that, when the connecting member is moved relative to the second body to a critical position between a first half part and a second half part of an opening process, a sum of torques generated under gravities of the first body and the connecting member balances with a torque generated under a force of a second elastic component; and as the connecting member is moved relative to the second body in the second half part of the opening process, a sum of torques generated under the gravities of the first body and the connecting member and under a force of the second elastic component is less than a torque generated under the rotating friction.

Preferably, a first rotating position-limiting mechanism is provided between the second hinge shaft and the connecting member, and is configured to stop rotation of the connecting member relative to the first shaft segment when the connecting member rotates to the critical position relative to the second body.

Preferably, a second rotating position-limiting mechanism is provided between the second hinge shaft and the second body, and is configured to stop rotation of the second hinge shaft relative to the second body when the connecting member is rotated into the open state relative to the second body.

Preferably, the first rotating position-limiting mechanism includes: first radial protrusion provided at a root portion of the first shaft segment; and a first arc groove provided in a side face of the connecting member, wherein the first arc groove is provided to be coaxial with the second hinge shaft; and the first radial protrusion is placed in the first arc groove. The second rotating position-limiting mechanism includes: a second radial protrusion provided at a root portion of the second shaft segment; and a second arc groove provided in a side face of the second body, wherein the second arc groove is configured to be coaxial with the second hinge shaft; and the second radial protrusion is placed in the second arc groove. The electronic device is configured in such a manner that, in the critical position, the first radial protrusion rotates to abut against the first circumferential side wall of the first arc groove so as to stop further opening the connecting member relative to the second hinge shaft; and in the open state, the second radial protrusion rotates to abut against the first circumferential side wall of the second arc groove, so as to stop further opening the second hinge shaft relative to the second body.

Preferably, the rotating friction arises from a transition fit between the second shaft segment and the second body, or from a friction damping structure between the second shaft segment and the second body.

Preferably, a signal communication between the first body and the second body is established via the connecting member.

Preferably, a touch display screen is provided on a first housing of the first body.

Preferably, an input keyboard is embedded and mounted onto the first housing of the second body, and in the open state, the lower rim of the first body is located in front of the input keyboard.

Preferably, when the state of relative position between the first body and the second body is in the closed state, the electronic device is in a tablet computer application mode; and when the state of relative position between the first body and the second body is in the open state, the electronic device is in a notebook computer application mode.

The electronic device according to the application is optimized in the connecting relationship between two bodies. Specifically, a connecting member is hinged between the first body and the second body, so as to have a state of relative position between the first body and the second body switched between an open state and a closed state. Besides, the electronic device is configured in such a manner that, in the closed state, a second housing of the first body abuts against a first housing of the second body, and in the open state, a lower rim of the first body is located at a front portion of the second body. The open state and the closed state of the electronic device may form different application modes. On the basis of the design of the connecting member, the first body and the second body in each state are used without being separated. Taking the electronic device having two application modes as an example, it is in a tablet computer application mode when in a closed state and in a notebook computer application mode when in an open state. In this way, the switching between two application modes of a tablet touch-sensitive mode and a keyboard input mode is easy to be realized.

Furthermore, during the switching of states of relative position of the electronic device, the lower rim of the first body keeps abutting against the upper surface of the second body. As such, a relative motion path between the two bodies during the switching of a state of relative position may be determined, which, on the one hand, may avoid unnecessary interference between the bodies and outside objects during switching, and on the other hand, makes the switching of states of relative position to be simpler and more reliable.

In a preferred solution of the application, a second elastic component and a lock-release mechanism are additionally provided, so as to realize the function of opening automatically. Specifically, the second elastic component is provided between a second hinge end of the connecting member hinged with the second body and the second body. In a closed state, the second elastic component has an elastic deformation and stores elastic deformation energy, so as to provide a force for driving the connecting member to switch into an open state. Furthermore, a lock-release mechanism is provided in the solution to lock the connecting member in a closed state. When the device is required to switch from a closed state to an open state, the lock-release mechanism releases the connecting member in a closed state, that is, unlocks the connecting member in a closed state. Then, the device is opened by driving the connecting member automatically with the second elastic component, that is to say, the opening of the connecting member is driven by an elastic deformation energy released from the second elastic component after the deformation recovery, without the need for a manual operation, which may further improve the experience of the user.

In another preferred solution of the present application, the opening process is divided according to functions into: a first half automatic opening part and a second half manual opening part. First, a first shaft segment at one end of the second hinge shaft is pivotally connected with and in a clearance fit with the connecting member; and a second shaft segment at the other end of the second hinge shaft is pivotally connected with the second body, having a rotating friction between the second shaft segment and the second body. Since the relative rotating resistance between the second hinge shaft and the connecting member is greater than the relative rotating resistance between the second hinge shaft and the second body, in the first half automatic opening part, the connecting member rotates relative to the first shaft segment of the second hinge shaft. Meanwhile, when the connecting member is rotated relative to the second body to a critical position between the first half part and the second half part of the opening process, a sum of torques generated under gravities of the first body and the connecting member balances a torque generated under a force of the second elastic component. As such, the connecting member is opened automatically under the action of the second elastic component for the first half part, till the sum of the torques generated under the gravities of the first body and the connecting member balances with the torque generated under the force of the second elastic component at the critical position. Next, when the connecting member is rotated relative to the second body in the second half part, the sum of the torques generated under the gravities of the first body and the connecting member is smaller than a torque generated under the rotating friction. Compared with the first half part, the torques generated under the gravities of the connecting member and the second body in the second half part are relatively small. In view of the rotating friction between the second shaft segment and the second body, a manual operation is required to open the device at any angle. In the second half manual opening part, the connecting member rotates relative to the second body along with the second shaft segment of the second hinge shaft. The division of the first half part and the second half part of the opening process has a better adaptability.

Figure 1:
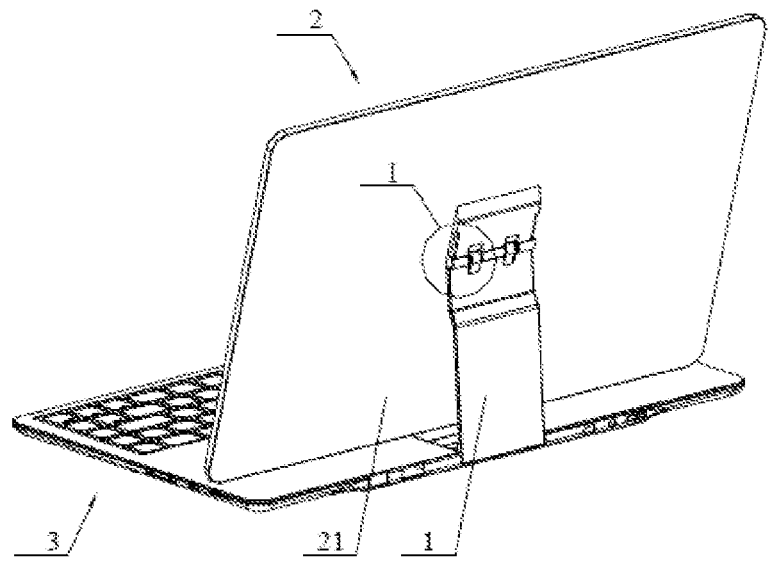
FIG. 1 is a schematic rear axonometric view of an electronic device in an open state according to an embodiment.

Reference numerals in FIGS. 1 to 16:

| | |
|---|---|
| 1 connecting member, | 11 first arc groove, |
| 111 first circumferential side wall, | 112 second circumferential side wall, |
| 2 first body, | 21 second housing, |
| 22 first attaching seat, | 23 first housing, |
| 231 touching display screen, | 3 second body, |
| 31 first housing, | 311 input keyboard, |
| 32 second attaching seat, | 33 second arc groove, |
| 331 first circumferential side wall, | 332 second circumferential side wall, |
| 4 first hinge shaft, | 5 second hinge shaft, |
| 51 first shaft segment, | 511 first radial protrusion, |
| 52 second shaft segment, | 521 second radial protrusion, |
| 6 first torsion spring, | 7 second torsion spring, |
| 8 lock-release mechanism, | 81 force applying rod, |
| 811 force applying end, | 82 lock-release connecting rod, |
| 821 position-limiting portion, | 9 compression spring, |
| 10 Z-shaped spring; | 1' connecting member, |
| 2' first body, | 3' second body. |

DETAILED DESCRIPTION OF THE EMBODIMENTS

An object of the present application is to provide an electronic device having two bodies, which optimizes the implementation of the connecting relationship between the two bodies, so as to enable switching between an open state and a closed state of the electronic device. The embodiments will be explained in detail hereinafter in conjunction with the drawings.

Generally, an electronic device is mainly described in the present embodiment.

Figure 2:
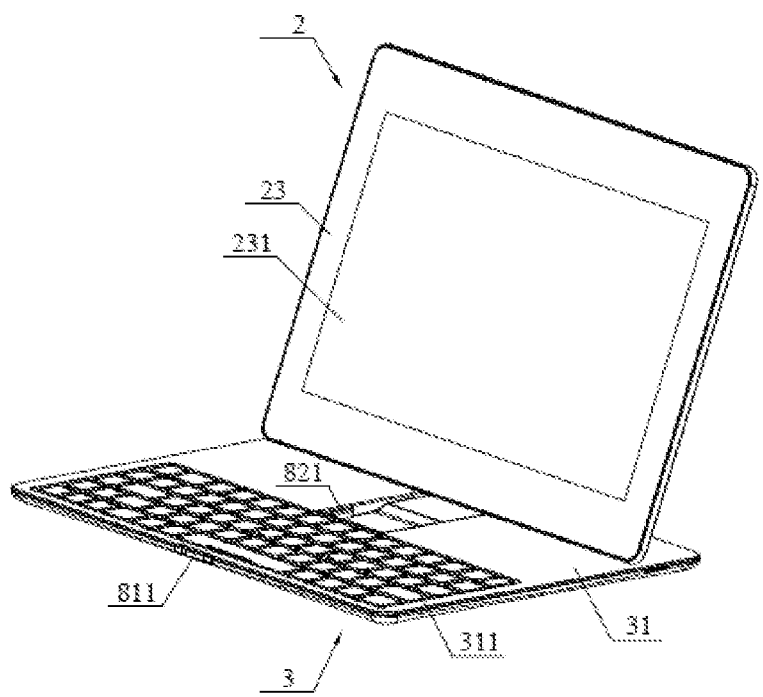
FIG. 2 is a schematic front axonometric view of the electronic device in the open state according to the embodiment.
Figure 3:
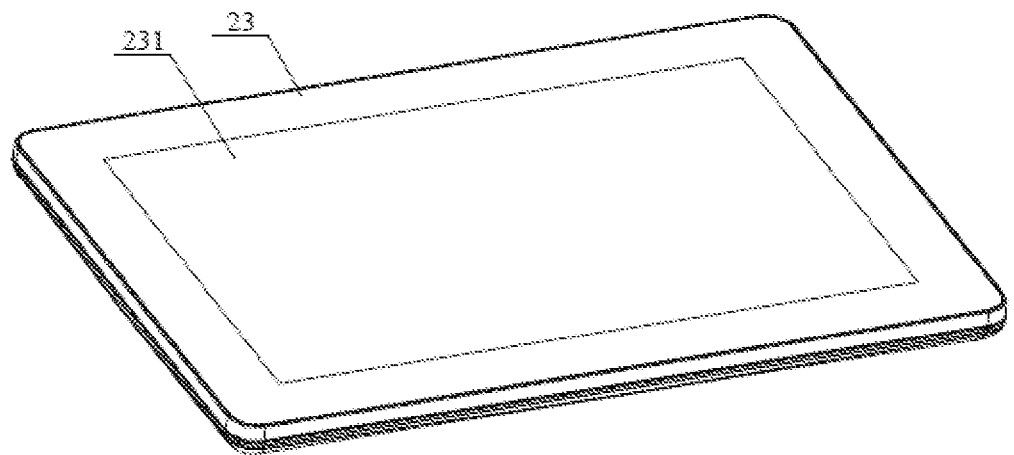
FIG. 3 is a schematic axonometric view of the electronic device in a closed state according to the embodiment.

Please refer to FIGS. 1, 2 and 3, wherein FIGS. 1 and 2 are rear and front schematic axonometric views of an electronic device in an open state according to the present embodiment, respectively; and FIG. 3 is a schematic axonometric view of the electronic device in a closed state.

The electronic device has a first body 2 and a second body 3 connected by a connecting member 1. One end of the connecting member 1 is hinged with the first body 2 via a first hinge shaft 4 (please refer to FIG. 4, which is an enlarged view of part I in FIG. 1.), and the connecting member 1 is hinged with the second body 3 via a second hinge shaft 5, so as to allow a state of relative position between the first body 2 and the second body 3 to be switched between an open state and a closed state. Specifically, in the open state as shown in FIG. 1, the first body 2 rotates clockwise about a hinge point where the first body 2 is hinged with the connecting member 1, and the connecting member 1 rotates anticlockwise about a hinge point where the connecting member 1 is hinged with the second body 3, so that the state of relative position between the first body 2 and the second body 3 may be switched from the open state to the closed state (as shown in FIG. 3); and vice versa. In this way, when the electronic device is in the closed state, (the state of relative position between the first body 2 and the second body 3 is in the closed state), the electronic device has an appearance of a tablet computer; and then, the electronic device may be set to be operated in a tablet computer application mode. For example, the display screen is configured to have a touch screen function. When the electronic device is in the open state (the state of relative position between the first body 2 and the second body 3 is in the open state), the electronic device has an appearance of a notebook computer; and then, the electronic device may be set to be operated in a notebook computer application mode.

In the present solution, the relative position between the first body and the second body may trigger the switching of the electronic device between the tablet computer application mode and the notebook computer application mode. The electronic device can be switched between the application modes for the purpose of providing a better user's operating experience when the first body and the second body of the electronic device are in the closed state (being a tablet computer in appearance), i.e., an operating experience of interactive interface and/or power consumption and/or the like more coincident with the tablet computer, as well as a better user's operating experience when the first body and the second body of the electronic device are in the open state (being an electronic device/notebook computer in appearance), i.e., an operating experience of interactive interface and/or performance and/or the like more coincident with the electronic device/notebook computer. The operating experience of the tablet computer is different from the operating experience of the notebook computer.

In the closed state as shown in FIG. 3, a second housing 21 of the first body 2 and a first housing 31 of the second body 3 are snuggled against each other, being in the tablet computer application mode; and in the open state as shown in FIG. 2, a lower rim of the first body 2 is located at a front part of the second body 3, being the notebook computer application mode. During the switching of states of relative position, the lower rim of the first body 2 keeps abutting against the upper surface of the second body 3. That is, during the switching of states of relative position, the lower rim of the first body 2 keeps contacting with the upper surface of the second body 3, so that a relative motion path between the two bodies of the electronic device can be better maintained, no matter whether the state of relative position between the first body 2 and the second body 3 is switched from the closed state to the open state manually or by releasing a lock-release mechanism. By such an arrangement, the whole process of switching the state of relative position between the first body 2 and the second body 3 of the electronic device from the closed state to the open state brings a smooth operating experience to the user.

Apparently, when the first body is switched between the closed state and the open state relative to the second body of the electronic device, the application mode may also not be switched, but maintain the same display interface.

Figure 4:
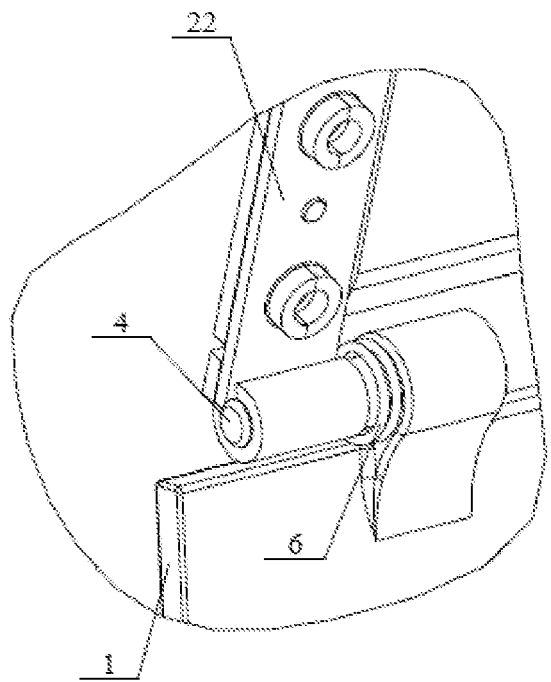
FIG. 4 is an enlarged view of part I of FIG. 1.

To ensure the lower rim of the first body 2 to abut against the upper surface of the second body 3 reliably and maintain the relative motion path therebetween, in the present solution, a first elastic component is provided between the connecting member 1 and the second body 3, and is configured in such a manner that the first elastic component in the closed state has an elastic deformation which may generate a force for switching the first body 2 to the open state. Preferably, the first elastic component is a first torsion spring 6, and for the specific connection thereof, referring to FIGS. 4 and 5, FIG. 5 is a schematic exploded view illustrating the assembly of the connecting member 1 in the present embodiment.

As shown, the first torsion spring 6 is arranged to be coaxial with the first hinge shaft 4. An elastic leg of the first torsion spring 6 abuts against a first attaching seat 22 fixed on the first body 2, and the other elastic leg abuts against a first hinge end of the connecting member 1 hinged with the first body 2. It is to be appreciated that, the first hinge shaft 4 and an elastic leg of the first torsion spring 6 may cooperate with the first body 2 via the first attaching seat 22, or directly. As the first body 2 is gradually closed relative to the second body 3, the first torsion spring 6 is elastically deformed accordingly. The first torsion spring 6 in the closed state stores a greater elastic deformation energy, and under the action of the elastic deformation energy, during the switching of a state of relative position, the lower rim of the first body 2 is capable of abutting against the upper surface of the second body 3 all along. Depending on the above functional requirement, a torsion force applied by the first torsion spring 6 may be further defined. Assumed that the positional switch starts from the closed state, the deformation of the first torsion spring 6 gradually decreases as the first body 2 is gradually opened relative to the second body 3, and the first torsion spring 6 provides a minimum torsion force when in a full open state. Thus, the magnitude of the torsion force provided by the first torsion spring 6 in a full open state may be determined according to the rotating friction of the first hinge shaft 4, that is, the torque generated under the minimum torsion force of the first torsion spring 6 in a full open state should be bigger than the torque generated under the rotating friction of the first hinge shaft 4. It should be appreciated that, in the case of extreme small rotating friction of the first hinge shaft 4, the effect of the rotating friction of the first hinge shaft 4 on the minimum torsion force of the first torsion spring 6 may be ignored.

It is to be noted that, the implementation of maintaining the lower rim of the first body 2 to abut against the upper surface of the second body 3 is not limited by adopting the first elastic component, and may be achieved by selecting any other structure according to the design of the whole machine. For example, the center of gravity of the first body 2 may be located between the lower rim thereof and the hinge portion thereof hinged with the connecting member 1, or a pair of magnetic components may also be provided respectively on the upper surface of the second body 3 and the lower rim of the first body 2. During the switching of state of relative position, on the basis of either the action of the torque generated under the gravity of the first body 2 or the action of the magnetic components, the lower rim of the first body 2 may be allowed to keep abutting against the upper surface of the second body 3.

Figure 5:
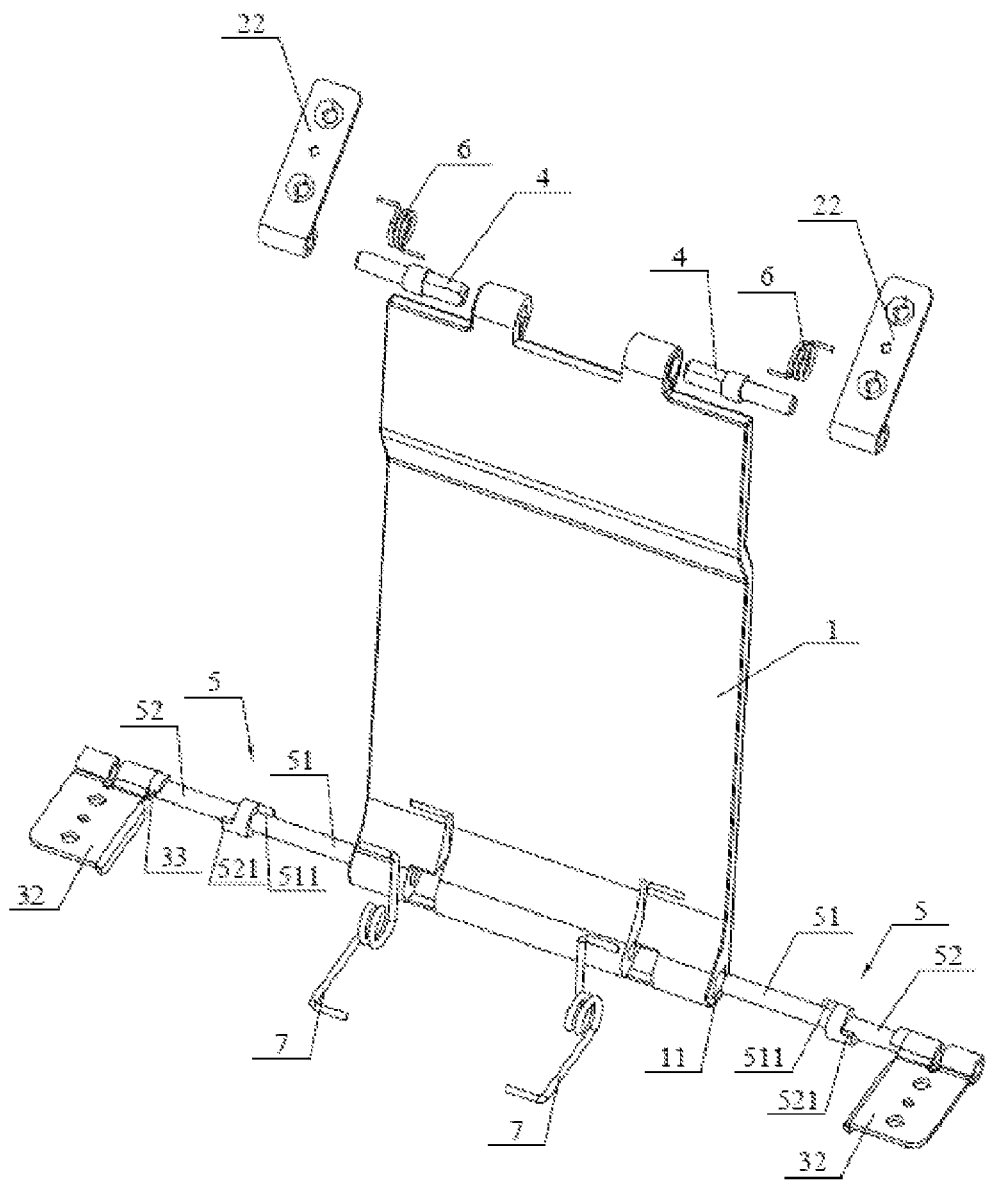
FIG. 5 is a schematic exploded view illustrating the assembly of a connecting member in an embodiment.

As further shown in FIG. 5, a second elastic component may also be provided between the second hinge end of the connecting member 1 hinged with the second body 3 and the second body 3. The second elastic component in the closed state has an elastic deformation which may generate a force for driving the connecting member 1 to be switched into the open state. Preferably, the second elastic component is a second torsion spring 7, that is to say, the elastic deformation of the second torsion spring 7 is used for providing a driving force to automatically open the connecting member 1. Also, a lock-release mechanism 8 is provided on the second body 3, and may lock or release the connecting member 1 in the closed state. When it is required to switch from the closed state to the open state, the lock-release mechanism 8 releases, i.e., unlocks the connecting member 1 in the closed state, and then the second torsion spring 7 automatically drives the connecting member 1 to open.

Figure 6:
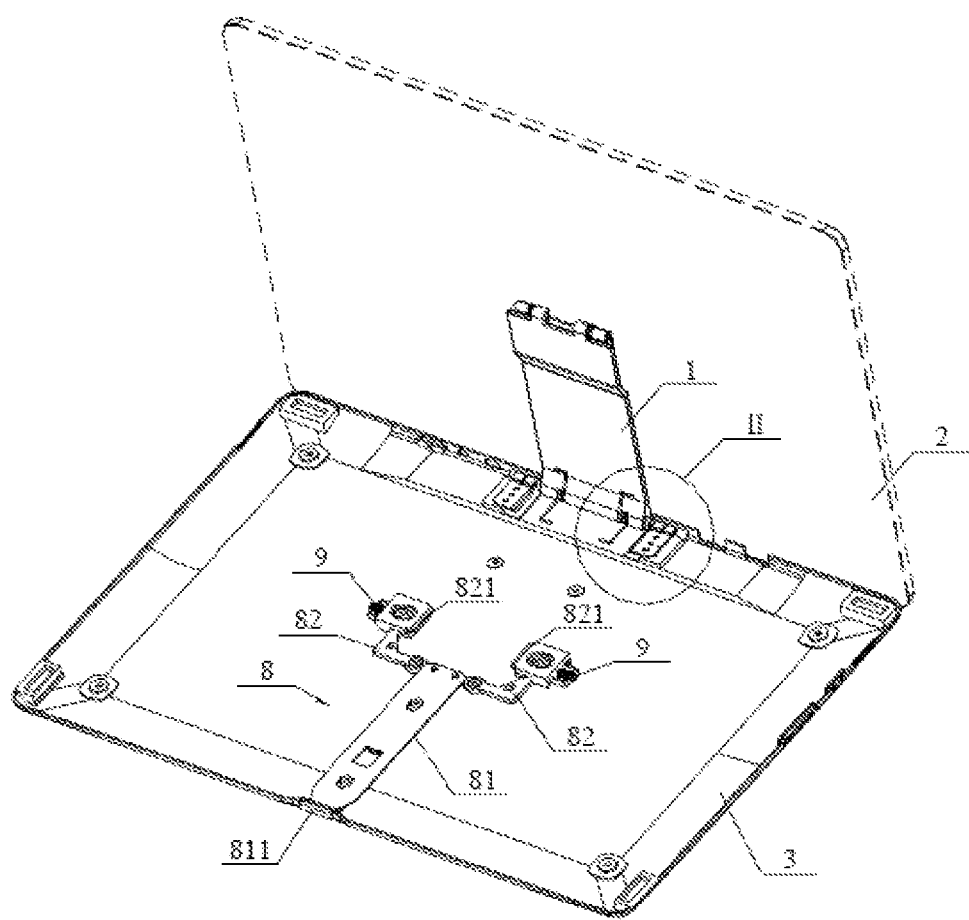
FIG. 6 is a partly disassembled view of FIG. 2.
Figure 7:
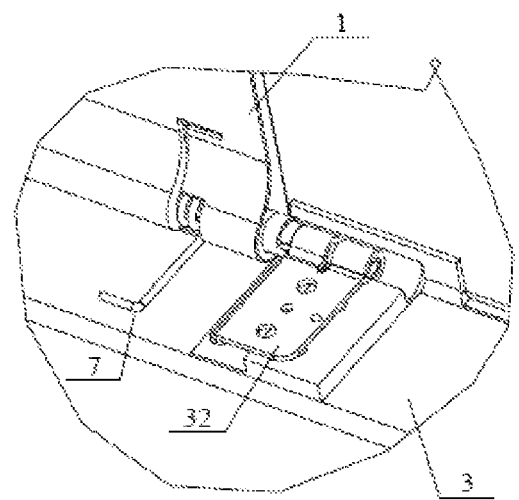
FIG. 7 is an enlarged view of part II of FIG. 6.

Specifically, referring to FIGS. 6 and 7, FIG. 6 is a partly disassembled view of FIG. 2, in which the first housing 31 of the second body 3 is detached and the first body 2 (indicated by a dotted line) is rotated to the rear side of the connecting member 1; and FIG. 7 is an enlarged view of part II of FIG. 6.

As shown in FIG. 6, the lock-release mechanism 8 includes a force applying rod 81 and a lock-release connecting rod 82. Specifically, the force applying end of the force applying rod 81 is located outside the housing of the second body 3. The lock-release connecting rod 82 has its middle portion hinged to the second body 3, and has one end hinged with the force applying rod 81 and the other end provided with a position-limiting portion 821. The lock-release mechanism 8 is configured in such a manner that, the position-limiting portion 821 in the closed state is located above the connecting member 1 so as to facilitate locking the connecting member 1, as shown in FIG. 2; a force applied from the force applying end 811 by the user may drive the lock-release connecting rod 82 to rotate till the position-limiting portion 821 is located beside the connecting member 1, so as to release the connecting member 1, and at this moment, the connecting member 1 may be opened automatically under the action of the second torsion spring 7, thereby driving the first body 2 to open automatically relative to the second body 3.

Figure 8:
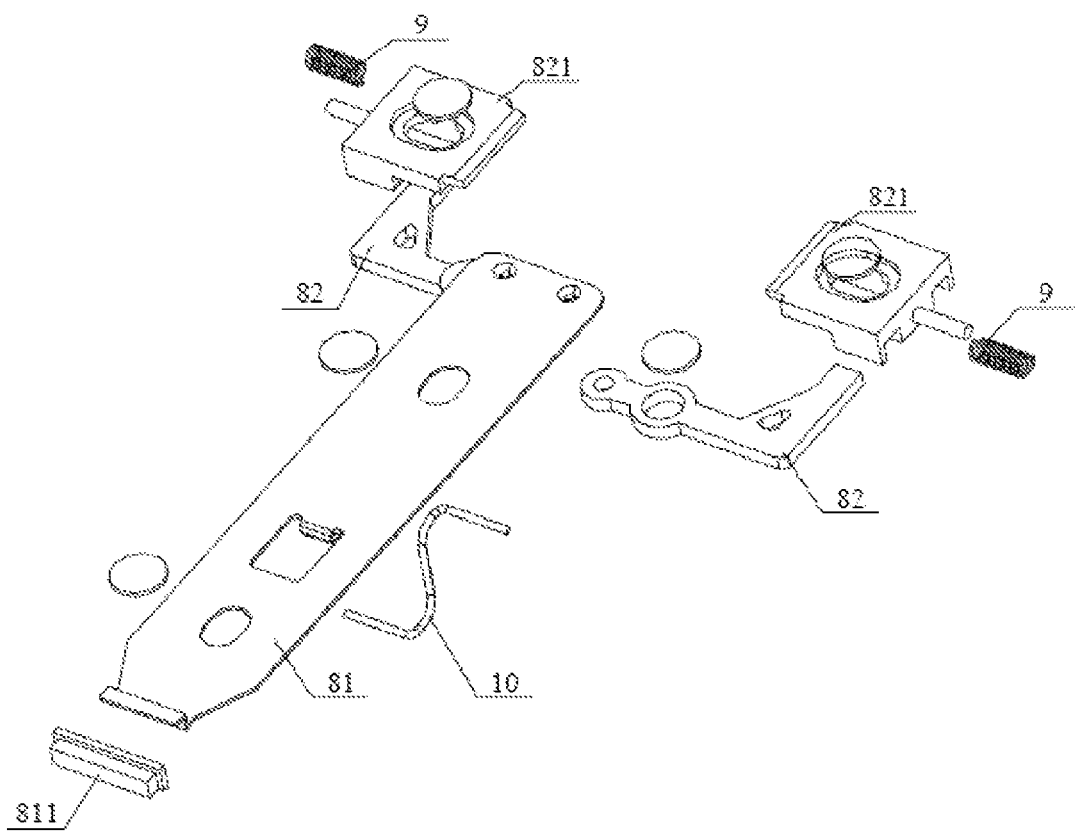
FIG. 8 is a schematic exploded view illustrating the assembly of a lock-release mechanism according to an embodiment.
Figure 9:
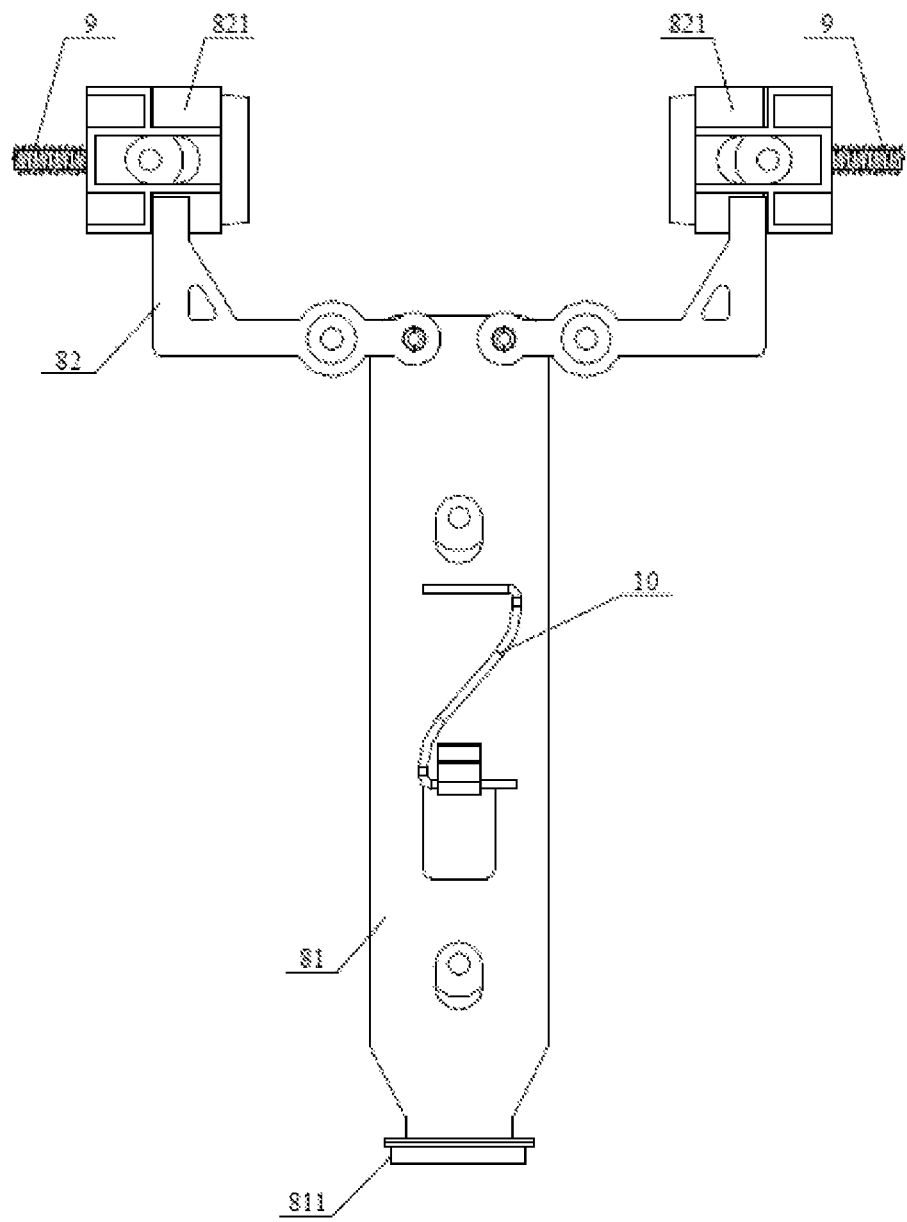
FIG. 9 is a schematic view illustrating an overall structure of the lock-release mechanism according to the embodiment.

As further shown in FIGS. 8 and 9, FIG. 8 is a schematic exploded view illustrating the assembly of the lock-release mechanism 8, and FIG. 9 is a schematic view illustrating the overall structure of the lock-release mechanism.

The lock-release mechanism further includes a third elastic component, and the third elastic component preferably adopts a compression spring 9 so as to reduce the assembly arrangement space. As shown, the compression spring 9 is arranged between the lock-release connecting rod 82 and the second body 3 so as to facilitate returning the lock-release connecting rod 82. That is to say, after the opening operation is performed each time, the compression spring 9 releases elastic deformation energy to drive the lock-release connecting rod 82 and the force applying rod 81 to return for the next operation. Apparently, the return of the lock-release connecting rods 82 finally causes the force applying rod 81 to return. In order to speed up the return response, a fourth elastic component may be provided between the force applying rod 81 and the second body 3. As shown in FIGS. 8 and 9, the fourth elastic component is specifically a Z-shaped spring 10 which is made by winding. The Z-shaped spring 10 generates an elastic deformation when being pressed as the user pushes the force applying rod 81 from the force applying end. In this way, after the opening operation is performed, the compression spring 9 and the Z-shaped spring 10 release elastic deformation energy at the same time, which may speed up the return response on the one hand and share the return force so as to reduce the overall dimension of the compression spring 9 on the other hand.

In order to balance the load, two lock-release connecting rods 82 and two compression springs 9 are provided, and are arranged symmetrically with respect to the force applying force 81. Further, the three elastic components in the present solution are not limited to the principle and structure as shown, and it is to be appreciated that, any structure, which may generate an elastic deformation with the movement of the cooperative members and release the elastic deformation energy to drive a reverse movement of the cooperative members, will fall within the protection scope claimed by the present application.

Figure 10:
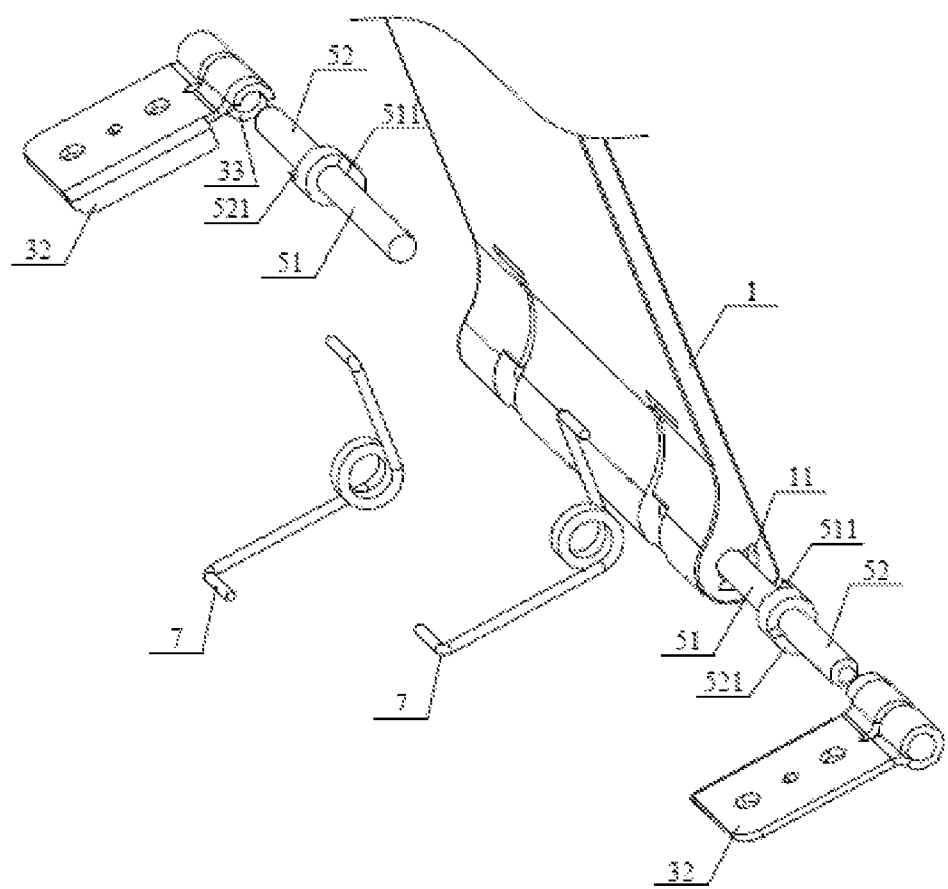
FIG. 10 is an exploded view illustrating the assembly of a second hinge end of the connecting member according to an embodiment.

In order to improve the adaptability of the opening operation of the electronic device according to the present solution, the opening process may also be divided into a first half part and a second half part. Referring to FIG. 10, it is an exploded view illustrating the assembly of the second hinge end of the connecting member 1.

Specifically, a first shaft segment 51 at one end of the second hinge shaft 5 is pivotally connected and is in a clearance fit with the connecting member 1; and a second shaft segment 52 at the other end of the second hinge shaft 5 is pivotally connected with the second attaching seat 32 fixed to the second body 3, and there is a rotating friction between the second shaft segment 52 and the second attaching seat 32. It is appreciated that the second shaft segment 52 may also be directly connected with the second body 3.

Specifically, when the connecting member 1 is moved relative to the second body 2 to a critical position between the first half part and the second half part of the opening process, a sum of torques generated under gravities of the first body 2 and the connecting member 1 balances with a torque generated under a force of the second torsion spring 7 (the second elastic component). As such, the connecting member 1 is opened automatically for the first half part under the action of the second torsion spring 7, till the sum of the torques generated under the gravities of the first body 2 and the connecting member 1 balances with the torque generated under the force of the second torsion spring 7. When the connecting member 1 is moved relative to the second body 3 during the second half part of the opening process, the sum of the torques generated under the gravities of the first body 2 and the connecting member 1 is less than the torque arising from the rotating friction between the second shaft segment 52 and the second attaching seat 32. Compared with the first half part of the opening process, the torque generated under the gravities of the connecting member 1 and the second body 2 in the second half part is relatively small, and thus in view of the rotating friction between the second shaft segment 52 and the second body 2, a manual operation is required to open the electronic device by any desired angle. In the second half manual opening part, the connecting member 1, together with the second shaft segment 52 of the second hinge shaft 5, is rotated relative to the second body 3.

On the basis of the above cooperation relationship, the operating force in the second half manual opening part may also cause the connecting member 1 to rotate by a small angle relative to the first shaft segment 51, and when released, the second torsion spring 7 may cause the connecting member 1 to rotate back by the small angle, resulting in influence on the travel control of the second half manual opening part more or less. In view of the fact, a first rotating position-limiting mechanism may be provided between the second hinge shaft 5 and the connecting member 1, and may be configured in such a manner that, when the connecting member 1 rotates to the critical position relative to the second body 2, the first rotating position-limiting mechanism stops the rotation of the connecting member 1 relative to the first shaft segment 51. Thus, it is possible to completely avoid the rotation of the connecting member 1 relative to the first shaft segment 51 in the second half manual opening part.

Further, in order to effectively limit the fully opening angle of the connecting member 1 relative to the second body 3, a second rotating position-limiting mechanism may also be provided between the second hinge shaft 5 and the second body 3, and may be configured in such a manner that, when the connecting member 1 is opened relative to the second body 3, the second rotating position-limiting mechanism stops the rotation of the second hinge shaft 5 relative to the second body 3.

According to the practical assembly space and requirements for the actuating performance, the above first rotating position-limiting mechanism and the second rotating position-limiting mechanism can be implemented with various structures. In the present solution, a radial protrusion and an arc groove are preferably provided and cooperated with each other. Referring to FIG. 10, the first rotating position-limiting mechanism includes a first radial protrusion 511 and a first arc groove 11 cooperated with each other, and the second rotating position-limiting mechanism includes a second radial protrusion 521 and a second arc groove 33.

Figure 11:
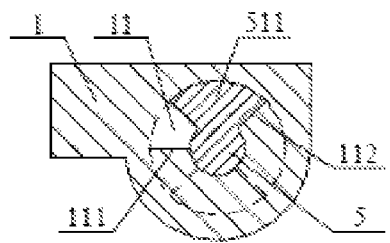
FIG. 11 is a schematic view illustrating a relative position relationship between a first radial protrusion and a first arc groove in a closed state.
Figure 12:
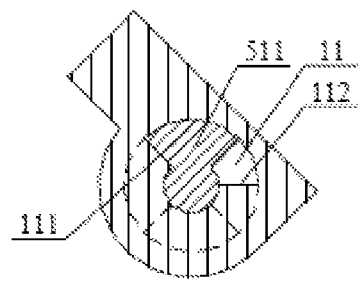
FIG. 12 is a schematic view illustrating a relative position relationship between a first radial protrusion and a first arc groove in a critical state.

Specifically, the first radial protrusion 511 is arranged at a root portion of the first shaft segment 51, and the first arc groove 11 is arranged in a side face of the connecting member 1 and is arranged to be coaxial with the second hinge shaft 5, such that the first radial protrusion 511 placed in the first arc groove 11 is slidable in the first arc groove 11 along an arc path. Referring to FIGS. 11 and 12, FIG. 11 is a schematic view illustrating a relative position relationship between the first radial protrusion and the first arc groove in a closed state, and FIG. 12 is a schematic view illustrating the relative position relationship between the first radial protrusion and the first arc groove in a critical state.

Figure 13:
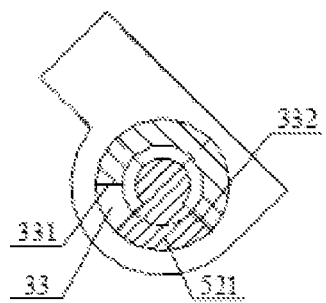
FIG. 13 is a schematic view illustrating a relative position relationship between a second radial protrusion and a second arc groove in a closed state.
Figure 14:
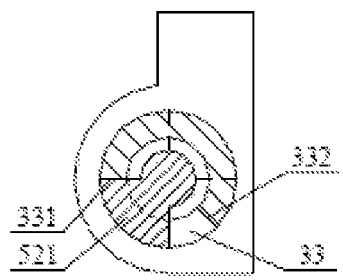
FIG. 14 is a schematic view illustrating a relative position relationship between a second radial protrusion and a second arc groove in a critical state.

Specifically, the second radial protrusion 521 is arranged at a root portion of the second shaft segment 52, and a second arc groove 33 is arranged in a side face of the second body 3 and is arranged to be coaxial with the second hinge shaft 5, such that the second radial protrusion 521 placed in the second arc groove 33 is slidable in the second arc groove 33 along an arc path. Referring to FIGS. 13 and 14, FIG. 13 is a schematic view illustrating a relative position relationship between the second radial protrusion and the second arc groove in a closed state, and FIG. 14 is a schematic view illustrating the relative position relationship between the second radial protrusion and the second arc groove in a critical state.

As shown in FIG. 12, in the critical state, the first radial protrusion 511 abuts against a first circumferential side wall 111 of the first arc groove 11, so as to stop the rotation of the connecting member 1 relative to the second hinge shaft 5. Here, the first half automatic opening part driven by the second torsion spring 7 is completed. As shown in FIG. 14, in the open state, the second radial protrusion 521 is rotated to abut against the first circumferential side wall 331 of the second arc groove 33, so as to stop the further open of the second hinge shaft 5 relative to the second body 3. At this point, the second half manual opening part is completed.

In the second half manual opening part, due to the rotating friction existing between the second shaft segment 52 and the second body 3, the manual operation is required to open the electronic device at any desired angle. Further, as the opening angle is larger, the torques generated by the gravities and the torsion spring also gradually become smaller. Specifically, the rotating friction may be formed from a transition fit between the second shaft segment 52 and the second attaching seat 32 (i.e., the second body), or by a friction damping structure between the second shaft segment 52 and the second attaching seat 32 (i.e., the second body). It should be appreciated that, it is possible to adopt any structure based on the conventional technical means which may achieve the function of division of the opening process and the function of maintaining and positioning of the manual opening operation.

Further, in the closed state, the first radial protrusion 511 may abut against a second circumferential side wall 112 of the first arc groove 11 (as shown in FIG. 11), so as to limit precisely the rotating path of the first half opening part, imposing a high requirement on the manufacture precision of parts fitted with each other. Alternatively, there may be a clearance between the first radial protrusion 511 and the second circumferential side wall 112, having a lower processing cost as compared with the embodiment without a clearance therebetween. Similarly, the second radial protrusion 521 abuts against the second circumferential side wall 332 of the second arc groove 33 in the closed state (as shown in FIG. 13), or there may be a clearance between the second radial protrusion 521 and the second circumferential side wall 332.

It is to be noted that, though the maximum opening angle of the connecting member 1 relative to the second body 3 as shown is 90 degrees and the rotating angle of the connecting member 1 relative to the first shaft segment 51 in the first half automatic opening part is 45 degrees, the example as shown is only exemplary and these angles may be varied by adjusting the circumferential dimensions of the radial protrusion and the arc groove cooperated with each other.

As an electronic device having double application modes, a touch display screen 231 is provided on the first housing 23 of the first body 2, so as to be used in a tablet computer application mode as shown in FIG. 3. An input keyboard 311 is provided and embedded into the first housing 31 of the second body 3, as shown in FIGS. 1 and 2. In the open state, a lower rim of the first body 2 is located in front of the input keyboard 311, so as to perform the keyboard instruction input in a conventional notebook computer application mode.

Furthermore, in order to further optimize the transmission of the electric signal and data signal between the first body 2 and the second body 3, the above signal communication between the first body 2 and the second body 3 may be established via a connecting member, without adopting other wiring structures, resulting in a simple and compact structure.

Figure 15:
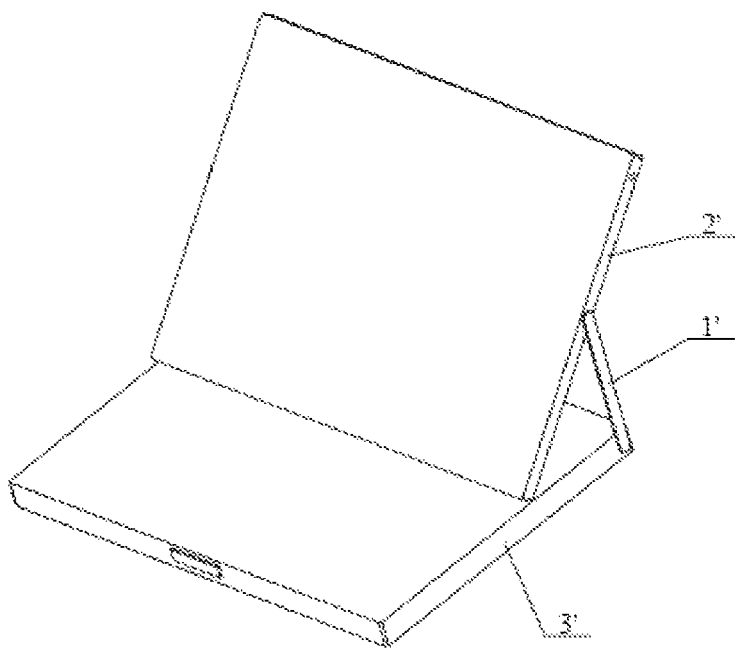
FIG. 15 is a schematic view of an electronic device in an open state according to a second embodiment.
Figure 16:
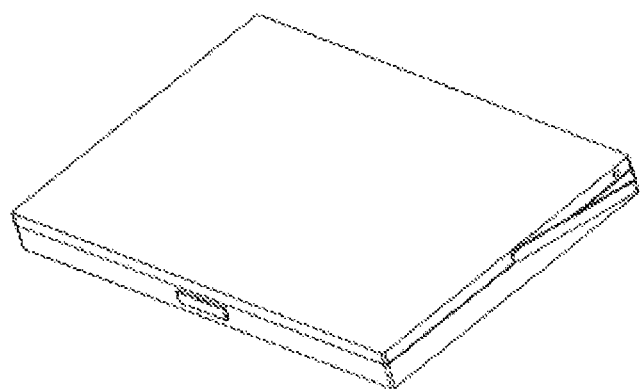
FIG. 16 is a schematic view of the electronic device in a closed state according to the second embodiment.

It is to be noted that, in the solution, members such as the first hinge shaft 4 and the second hinge shaft 5 and the elastic components, which are cooperated with each other, are provided as two sets arranged symmetrically with respect to the electronic device so as to balance the load. Practically, in the case of the first body 2 with a low weight, only one set of these members may be provided at the middle portion of the first body 2. Similarly, the connecting member 1 in the present solution is an independent member arranged at the middle portions of the first body 2 and the second body 3. As shown in FIGS. 15 and 16, two connecting members 1' may be provided, and may be symmetrically arranged at two sides of the first body 2' and the second body 3'. Specifically, FIG. 15 is a schematic view of the electronic device in an open state, and FIG. 16 is a schematic view of the electronic device in a closed state.

The above description only refers to the preferred embodiments of the present application. It should be noted that, for an ordinary skilled in the art, many improvements and modifications can be made without departing from the principle of the present application, and all these improvements and modifications should be deemed as falling into the protection scope of the present application.

What is claimed is:

1. An electronic device, comprising:
   a first body;
   a second body connected to the first body; and
   a connecting member, wherein the connecting member is hinged with the first body via a first hinge shaft and is hinged with the second body via a second hinge shaft, such as to allow a state of relative position between the first body and the second body to be switched between an open state and a closed state;
   wherein the electronic device is configured in such a manner that, in the closed state, a second housing of the first body snuggles against a first housing of the second body, and in the open state, a lower rim of the first body is located at a front portion of the second body; and the lower rim of the first body keeps abutting against an upper surface of the second body while the state of relative position is switched; and wherein the center of gravity of the first body is located between the lower rim of the first body and a hinge portion of the first body hinged with the connecting member, to allow the lower rim of the first body to keep abutting against the upper surface of the second body while the state of relative position is switched.

2. The electronic device according to claim 1, further comprising:
a first elastic component arranged between a first hinge end of the connecting member hinged with the first body and the first body, wherein the first elastic component is configured in such a manner that the first elastic component in the closed state has an elastic deformation generating a force for switching the first body into the open state, such that the lower rim of the first body keeps abutting against the upper surface of the second body while the state of relative position is switched.

3. The electronic device according to claim 2, wherein the first elastic component is a first torsion spring arranged to be coaxial with the first hinge shaft.

4. The electronic device according to claim 1, wherein matched magnetic components are provided on the upper surface of the second body and the lower rim of the first body, respectively, so that the lower rim of the first body keeps abutting against the upper surface of the second body while the state of relative position is switched.

5. The electronic device according to claim 1, further comprising:
a second elastic component arranged between a second hinge end of the connecting member hinged with the second body and the second body, wherein the second elastic component is configured in such a manner that the second elastic component in the closed state has an elastic deformation generating a force for driving the connecting member to be switched into the open state; and
a lock-release mechanism arranged on the second body and configured to lock or release the connecting member in the closed state.

6. The electronic device according to claim 5, wherein the lock-release mechanism comprises:
a force applying rod, wherein a force applying end of the force applying rod is located outside a housing of the second body;
a lock-release connecting rod having a middle portion hinged to the second body, and one end hinged with the force applying rod and the other end provided with a position-limiting portion, wherein the lock-release connecting rod is configured in such a manner that, the position-limiting portion in the closed state is located above the connecting member so as to lock the connecting member; a force applied from the force applying end can drive the lock-release connecting rod to rotate till the position-limiting portion is located beside the connecting member so as to release the connecting member.

7. The electronic device according to claim 6, wherein the lock-release mechanism further comprises:
a third elastic component arranged between the lock-release connecting rod and the second body so as to facilitate returning the lock-release connecting rod.

8. The electronic device according to claim 7, wherein two lock-release connecting rods and two third elastic components are provided and arranged symmetrically with respect to the force applying rod.

9. The electronic device according to claim 5, wherein a first shaft segment at one end of the second hinge shaft is pivotally connected and in a clearance fit with the connecting member; a second shaft segment at the other end of the second hinge shaft is pivotally connected with the second body, having a rotating friction therebetween; and
wherein the electronic device is configured in such a manner that, when the connecting member is moved relative to the second body to a critical position between a first half part and a second half part of an opening process, a sum of torques generated under gravities of the first body and the connecting member balances with a torque generated under a force of a second elastic component; and as the connecting member is moved relative to the second body in the second half part of the opening process, a sum of torques generated under the gravities of the first body and the connecting member and under a force of the second elastic component is less than a torque generated under the rotating friction.

10. The electronic device according to claim 9, wherein a first rotating position-limiting mechanism is provided between the second hinge shaft and the connecting member, and is configured to stop rotation of the connecting member relative to the first shaft segment when the connecting member rotates to the critical position relative to the second body.

11. The electronic device according to claim 10, wherein a second rotating position-limiting mechanism is provided between the second hinge shaft and the second body, and is configured to stop rotation of the second hinge shaft relative to the second body when the connecting member is rotated into the open state relative to the second body.

12. The electronic device according to claim 11, wherein the first rotating position-limiting mechanism comprises:
a first radial protrusion provided at a root portion of the first shaft segment; and
a first arc groove provided in a side face of the connecting member, wherein the first arc groove is configured to be coaxial with the second hinge shaft; and the first radial protrusion is disposed in the first arc groove;
the second rotating position-limiting mechanism comprises:
a second radial protrusion provided at a root portion of the second shaft segment; and
a second arc groove provided in a side face of the second body, wherein the second arc groove is configured to be coaxial with the second hinge shaft; and the second radial protrusion is disposed in the second arc groove;
and wherein the electronic device is configured in such a manner that, in the critical position, the first radial protrusion rotates to abut against the first circumferential side wall of the first arc groove so as to stop further opening the connecting member relative to the second hinge shaft; and in the open state, the second radial protrusion rotates to abut against the first circumferential side wall of the second arc groove, so as to stop further opening the second hinge shaft relative to the second body.

13. The electronic device according to claim 9, wherein the rotating friction arises from a transition fit between the second shaft segment and the second body, or from a friction damping structure between the second shaft segment and the second body.

14. The electronic device according to claim 1, wherein a signal communication between the first body and the second body is established via the connecting member.

15. The electronic device according to claim 14, wherein a touch display screen is provided on a first housing of the first body.

16. The electronic device according to claim 15, wherein an input keyboard is embedded and mounted onto the first housing of the second body, and in the open state, the lower rim of the first body is located in front of the input keyboard.

17. The electronic device according to claim 16, wherein, when the state of relative position between the first body and the second body is in the closed state, the electronic device is in a tablet computer application mode; and when the state of relative position between the first body and the second body is in the open state, the electronic device is in a notebook computer application mode.

\* \* \* \* \*